United States Patent
Smith

[15] 3,677,621
[45] July 18, 1972

[54] OPTICAL FIELD FLATTENING DEVICES

[72] Inventor: Francis Hughes Smith, York, England
[73] Assignee: Vickers Limited, London, England
[22] Filed: Nov. 24, 1970
[21] Appl. No.: 92,395

[30] Foreign Application Priority Data

Nov. 24, 1969 Great Britain...................57,463/69

[52] U.S. Cl..............................350/157, 350/14, 350/152, 350/169
[51] Int. Cl. ................................................G02b 27/28
[58] Field of Search.................350/147, 152, 157, 166, 169, 350/171, 14, 15

[56] References Cited

UNITED STATES PATENTS

| | | | |
|---|---|---|---|
| 3,389,632 | 6/1968 | Plummer | 350/152 |
| 3,508,809 | 4/1970 | Wilder et al. | 350/157 |
| 3,401,593 | 9/1968 | Altman | 350/157 X |
| 3,421,806 | 1/1969 | Weber | 350/169 X |

*Primary Examiner*—John K. Corbin
*Assistant Examiner*—Paul R. Miller
*Attorney*—Pennie, Edmonds, Morton, Taylor & Adams

[57] ABSTRACT

An optical device, for imposing a preselected degree of curvature upon an optical field associated with an image-bearing incident light beam, employs a light-polarizing beam splitter for splitting the incident light beam into a transmitted first beam and a reflected second beam, which first and second beams are linearly polarized in mutually perpendicular respective directions. Respective concave mirrors reflect the first and second beams so as to return them to the beam splitter, but respective polarization-changing members, mounted between the beam splitter and the concave mirrors, rotate the directions of linear polarization of the first and the second beams through 90° in the course of their passage from and back to the beam splitter. As a result, the returned first beam is reflected by the beam splitter, and the returned second beam is transmitted thereby for recombination with the first beam to form a single output beam.

15 Claims, 10 Drawing Figures

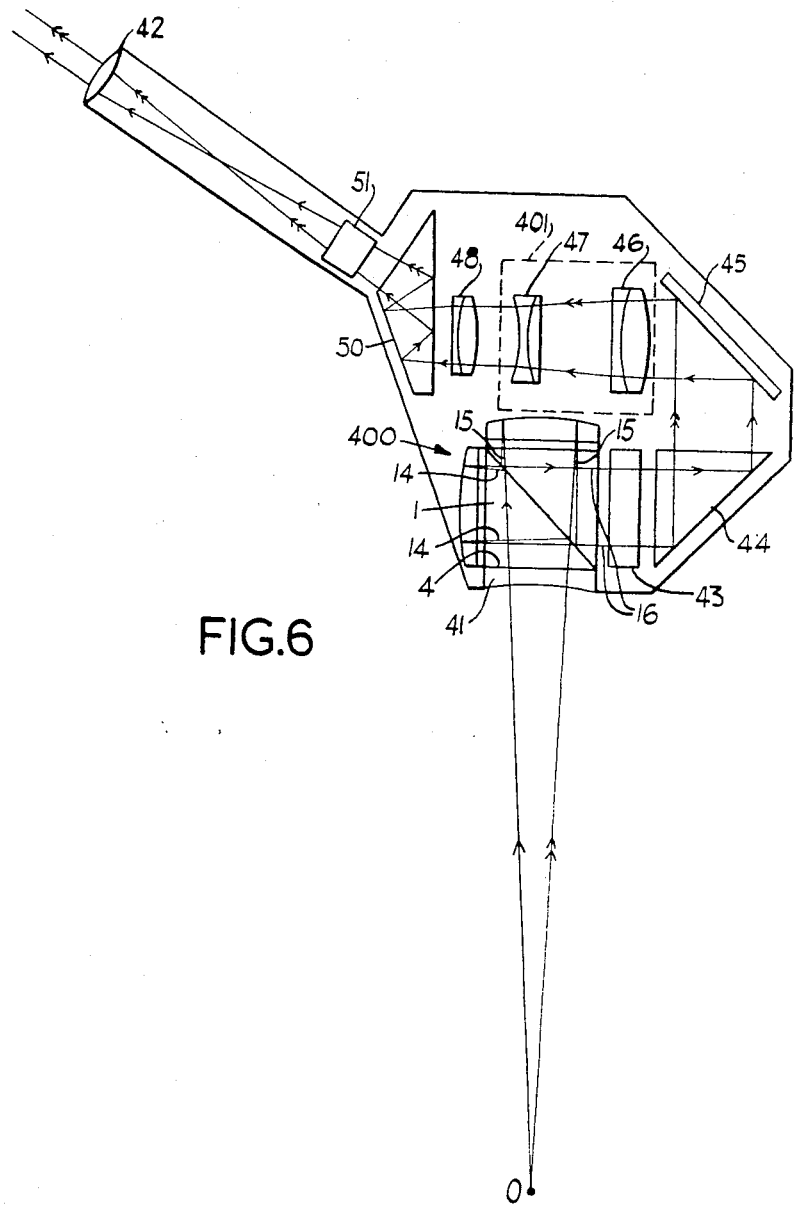

OPTICAL FIELD FLATTENING DEVICES

This invention relates to optical field flattening devices.

It is well known that lenticular refracting surfaces of positive power are inherently associated with positive contributions to the Petzval sum, whereby a positive lens system is afflicted with positive field curvature.

The corresponding Petzval contribution associated with a concave mirror is of negative sign, and therefore a concave mirror is associated with negative field curvature. Accordingly, it is possible in principle to compensate for the positive Petzval contributions of a system of positive lenses by including in the system a concave mirror of suitable radius of curvature and a partially reflecting layer, on the axis of the light beam incident on the mirror, to divert the beam away from the said axis after reflection by the concave mirror.

Hitherto, this method of reducing or eliminating positive field curvature of an imaging system employing positive lenses has been restricted on account of the loss of light arising from the use of the partially reflecting layer. This loss arises partly from the circumstance that the reflected beam is spatially coincident with the incident beam, so that the partially-reflecting layer necessarily obstructs the incident beam. In addition, being only partially reflecting, the said layer does not divert all of the light of the reflected beam.

According to the present invention there is provided an optical field flattening device for imposing a pre-selected degree of curvature upon an optical field associated with an image-bearing incident light beam, the device comprising: a light-polarizing beam splitter, for splitting the incident light beam into a transmitted first beam and a reflected second beam, which first and second beams are linearly polarized in mutually perpendicular respective directions; first and second concave mirrors mounted in respective dispositions, predetermined with respect to the beam splitter, for reflecting the first and second beams respectively back to the beam splitter; and respective polarization-changing members positioned between the beam splitter and the respective concave mirrors for rotating the respective directions of linear polarization of the first and second beams through 90° in the course of their passage from and back to the beam splitter; whereby the first beam after being initially transmitted by the beam splitter is subsequently reflected thereby, and the second beam after being initially reflected by the beam splitter is subsequently transmitted thereby for recombination with the first beam to form a single output beam.

Using the present invention there may be provided a reflecting field flattening device for which the effective intensity of the output beam is at least half that of the input beam.

For a better understanding of the invention, and to show how the same may be carried into effect, reference will now be made, by way of example, to the accompanying diagrammatic drawings in which:

FIG. 3b shows a view of the FIG. 3a device taken on the line B—B of FIG. 3a,

FIG. 3c shows a view of the FIG. 3a device taken on the line C—C of FIG. 3a,

Figure 1:
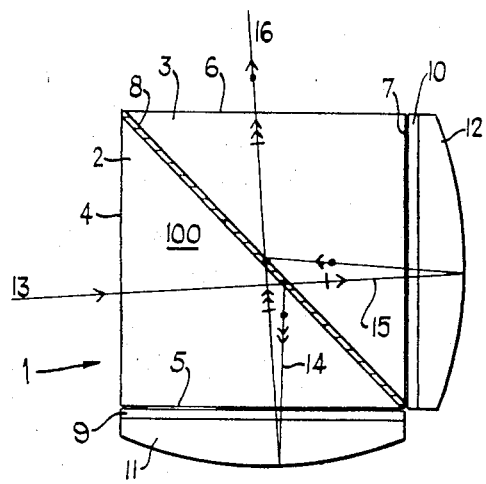
FIG. 1 shows an elevation of an optical field flattening device embodying the present invention.
Figure 3A:
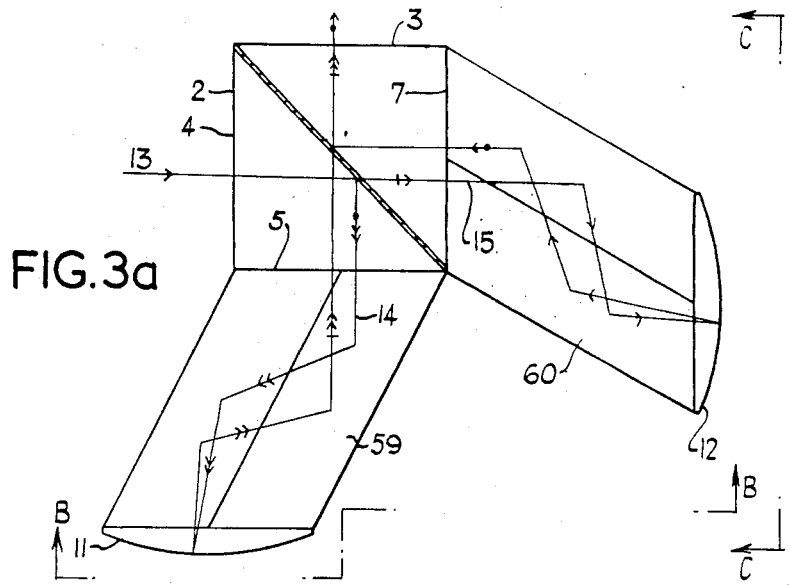
FIG. 3a shows an elevation of a second modified form of the FIG. 1 device.
Figure 3B:
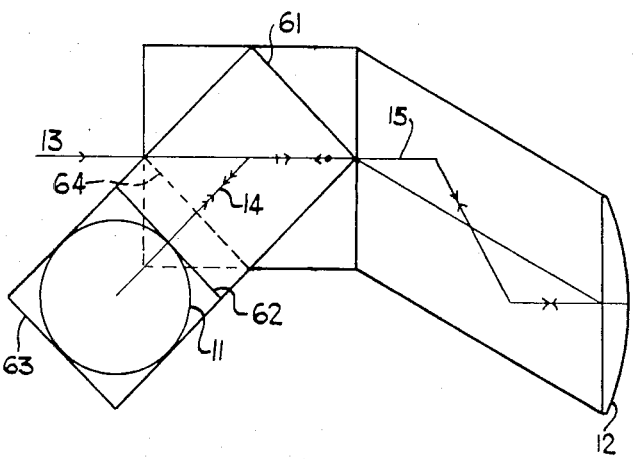
Figure 3C:
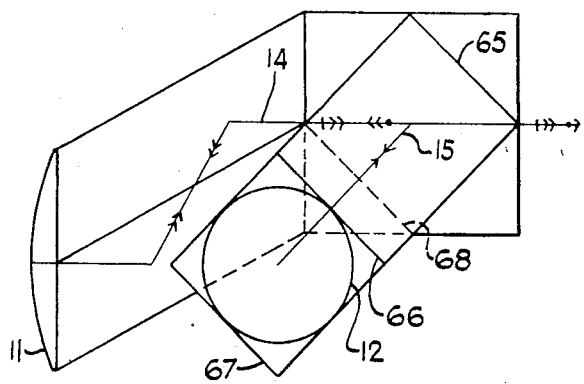
Figures 4A, 4B, 4C:
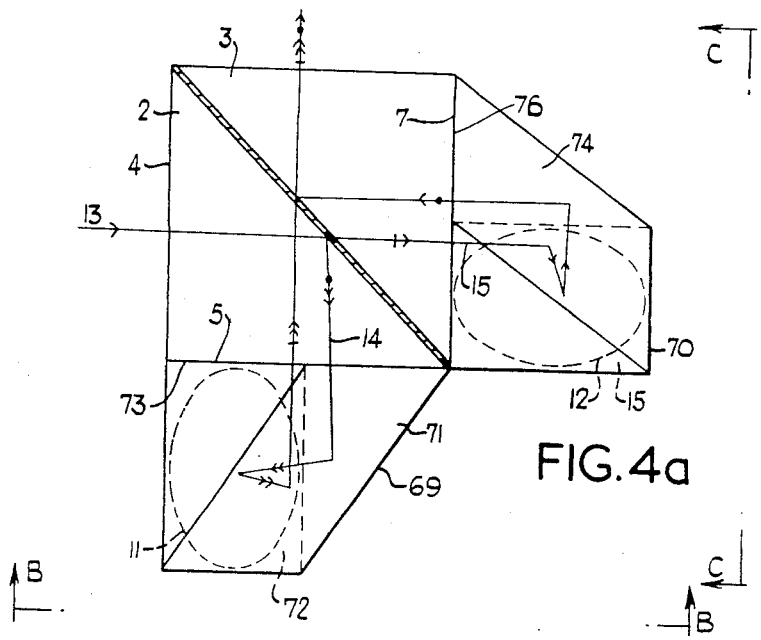
Figure 5:
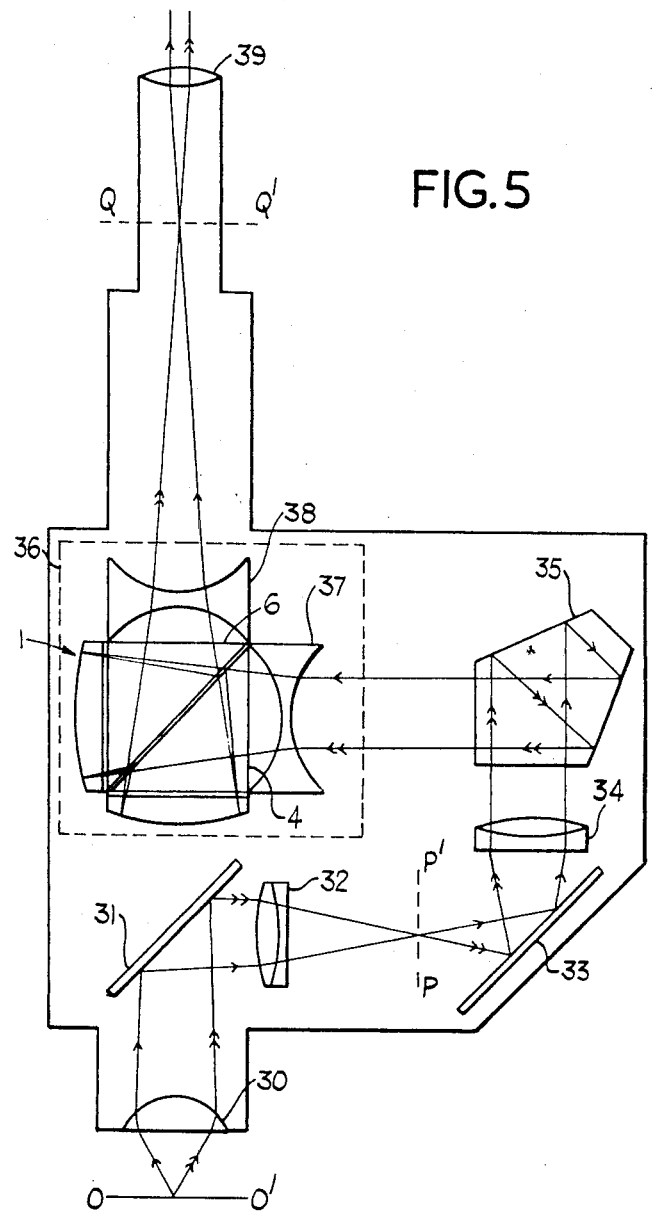

FIG. 4a shows an elevation of a modified form of the FIGS. 3a, 3b and 3c device, FIG. 4b shows a view of the FIG. 4a device taken on the line B—B of FIG. 4a, FIG. 4c shows a view of the FIG. 4a device taken on the line C—C of FIG. 4a, FIG. 5 shows an elevation of the optical system of a microscope including the device shown in FIG. 1, and FIG. 6 shows a side elevation of the optical system of a stereoscopic microscope including the device shown in FIG. 1.

In the drawings, like reference numerals are used to refer to like components.

FIG. 1 illustrates a device 1 comprising two Porro prisms 2 and 3. The prism 2 has a hypotenuse face and two mutually perpendicular lateral faces 4 and 5. Similarly, the prism 3 has a hypotenuse face and two mutually perpendicular lateral faces 6 and 7. The hypotenuse face of one of the prisms 2 and 3 is coated, in a manner known in the art, with a stack 8 of films of dielectric material. This one prism is arranged with its principal sections parallel to the principal sections of the other prism and is cemented at its coated hypotenuse face to the hypotenuse face of the other prism so as to form a Swan cube assembly 100. The lateral face 4 of the prism 2 constitutes an input face of the device and the adjacent lateral face 6 of the prism 3 constitutes an output face of the device. A birefringent quarter-wave retardation plate 9 is cemented to the lateral face 5 of the prism 2, and a birefringent quarter-wave retardation plate 10 is cemented to the adjacent lateral face 7 of the prism 3. A concave mirror 11, comprising a plano-convex lens silvered at its convex surface, is cemented at its plane surface to the plate 9 and an identical mirror 12 is secured in similar manner to the plate 10. This construction avoids loss of light due to air-glass reflections in the device 1. The axes of the two mirrors 11 and 12 intersect at the center of the assembly 100, the apices of the mirrors being equidistant from the center of the Swan cube assembly.

If a beam of unpolarized light 13 enters the assembly 100, passing through the input face 4 and falling upon the hypotenuse face of the prism 2, it is split into a beam 14 which is reflected towards the mirror 11, and a beam 15 which is transmitted towards the mirror 12. The combined effect of the films of dielectric material is to polarize the reflected beam linearly with its electric vector perpendicular to the plane of the Figure, the transmitted beam being linearly polarized with its electric vector parallel to the plane of the Figure.

The reflected and transmitted beams reach the mirrors 11 and 12 respectively after passing through the birefringent quarter-wave retardation plates 9 and 10 and are reflected by the mirrors back through the plates 9 and 10 to the stack 8 of films of dielectric material. The polarization extinction directions of the plates 9 and 10 are at 45° to the principal sections of the Swan cube assembly 100, so that the double transmission of each beam through one of the plates is equivalent to a single transmission through a birefringent half-wave retardation plate, and consequently the directions of linear polarization of the beams 14 and 15 are rotated by substantially 90° by virtue of their double passage through the plates 9 and 10 respectively. Accordingly, the beam 14 returns into the prism 2 with its electric vector parallel to the plane of the Figure, and accordingly is strongly transmitted by the dielectric material out of the assembly 100 through the output face 6. On the other hand, on re-entering the prism 3 the electric vector of the beam 15 is perpendicular to the plane of the Figure and so that beam is strongly reflected out of the Swan cube assembly by way of the output face 6. Accordingly, the two beams 14 and 15 are recombined into a single output beam 16 which is discharged from the device 1 through the face 6.

Figure 2:
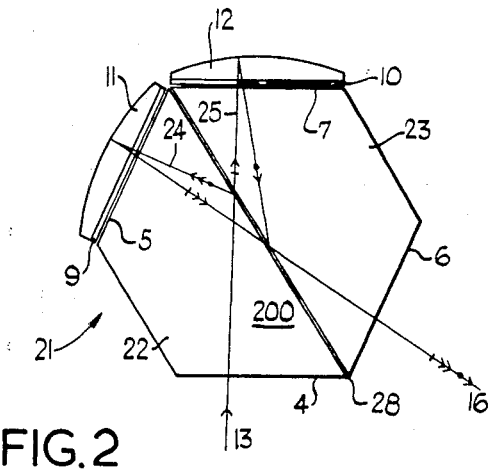
FIG. 2 shows an elevation of a modified form of the FIG. 1 device.

This relatively simple system, which has been described to disclose the underlying principles of the invention, suffers from two defects. Firstly, known polarizing combinations of dielectric films do not uniformly polarize for all wavelengths of the visible spectrum, and so light at wavelengths associated with only partial polarization by the stack 8 of dielectric films in the Swan cube assembly would be only partially reflected. Light would be lost by this partial reflection. The use of polarizing combinations of dielectric films could be avoided by replacing the Swan cube assembly 100 by a birefringent polarizing prism of the kind which splits an incident unpolarized beam into an ordinary beam and an extraordinary beam. A suitable polarizing prism would be similar to that due to Foster, described in the Journal of the Optical Society of America, 28, 124. However, the blackening and silvering of different surfaces of the Foster prism would be omitted and some of the faces would be differently oriented. FIG. 2 illustrates how such a prism would replace the Swan cube assembly 100 of FIG. 1.

FIG. 2 illustrates a device 21 comprising two calcite prism 22 and 23 cemented together to form a polarizing prism assembly 200. The prism 22 is trapezoidal and has two parallel lateral faces of unequal length and two inclined lateral faces 4 and 5. The prism 23 is trapezoidal and has two parallel lateral faces of unequal length and two inclined lateral faces 6 and 7 of equal length. The prism 22 is arranged with its principal sections parallel to the principal sections of the prism 23 and is cemented at the longer of its two parallel lateral faces to the longer of the two parallel lateral faces of the prism 23 by means of a layer 28 Canada balsam. The axes of the two mirrors 11 and 12 intersect at the join between the prisms 22 and 23, the apices of the mirrors being equidistant from the point of intersection.

If the beam 13 of unpolarized light enters the assembly 200, passing through the lateral face 4 of the prism 22 and falling upon the interface between the calcite prism 22 and the Canada balsam cement, it is divided into an ordinary beam 24 which is reflected through the face 5 towards the mirror 11 and an extraordinary beam 25 which is transmitted through the face 7 towards the mirror 12. The ordinary and extraordinary beams are polarized in mutually perpendicular respective directions, the direction of the electric vector of the ordinary beam being perpendicular to the plane of the Figure and the direction of the electric vector of the extraordinary beam being parallel to the plane of the Figure. As in the case of the FIG. 1 device, the reflected and transmitted beams are returned to the prism by reflection at the mirrors 11 and 12 and undergo double transmission through the quarter wave plates 9 and 10, whereby the directions of polarization of the beams are rotated by 90°. Therefore the beam 24 returns into the prism 22 with its electric vector parallel to the plane of the Figure, and accordingly is strongly transmitted out of the assembly 200 through the face 6 of the prism 23. On the other hand, on re-entering the prism 23 the polarization direction of the beam 25 is perpendicular to the plane of the Figure so that beam is strongly reflected out of the assembly 200 by way of the lateral face 6 of the prism 23. Accordingly, the two beams 24 and 25 are recombined into the single output beam 16 which is discharged from the device 21 through the face 6.

In the case of the FIG. 2 device, the faces 5 and 6 of the prisms 22 and 23 extend at right angles to the axes of the mirrors 11 and 12 respectively, and this avoids lateral displacement of the beams 24 and 16 on passing through those faces. Also, it permits the quarter-wave plate 9 to be cemented directly to the face 5 and thereby avoids air-glass reflections.

In FIGS. 1 and 2 the radii of curvature of the concave mirrors 11 are equal to the radii of curvature of the concave mirrors 12 and the dispositions of the mirrors 11 are symmetrical with respect to those of the mirrors 12 about the dielectric material (in the case of FIG. 1) and the Canada balsam cement (in the case of FIG. 2). However, this need not be so provided that the beams 14 and 15 (in the case of FIG. 1) and the beams 24 and 25 (in the case of FIG. 2) are brought to a focus at the same position so that the images borne by the beams 14 and 15 are mutually coincident and the images borne by the beams 24 and 25 are mutually coincident.

The second defect of the FIG. 1 device arises from the fact that a birefringent quarter-wave retardation plate functions as such for only one wavelength band of the spectrum, so that the FIGS. 1 and 2 devices would not operate with equal efficiency for all wavelengths of the visible spectrum. This difficulty may be avoided by replacing the plates by polarization-changing members which function as quarter-wave retardation plates for substantially the whole visible spectrum. Such a member is the classically-known Fresnel rhomb. Two Fresnel rhombs would normally be employed, one in place of each of the quarter-wave plates 9 and 10. The principal sections of the rhombs would be inclined at 45° to those of the Swan cube assembly 100. A fresnel employs two total internal reflections circularly to polarize a linearly polarized incident beam having its electric vector at 45 degrees to the principal sections of the rhomb. If a mirror is arranged to reflect the circularly polarized output beam back along its path into the rhomb it undergoes two further total internal reflections so that the emergent beam is linearly polarized at 45° to the original incident beam. A Fresnel rhomb functions in this way, i.e. if suitably oriented it rotates the direction of polarization of a linearly-polarized incident light beam through 90° on a double transmission therethrough, for substantially the whole visible spectrum.

By using a polarizing prism assembly, such as the assembly 200 of FIG. 2, in combination with Fresnel rhombs instead of the birefringent quarter-wave retardation plates 9 and 10, uniformly high transmission over the entire visible spectrum may be achieved.

A device similar to that of FIG. 1 but modified insofar as it employs Fresnel rhombs in place of the quarter-wave plates 9 and 10 of FIG. 1 is illustrated in FIGS. 3a, 3b and 3c and comprises two Fresnel rhombs 59 and 60 in place of the birefringent quarter-wave retardation plates 9 and 10 respectively of the FIG. 1 device. The rhomb 59 has four lateral edges 61, 62, 63 and 64, and has four lateral faces extending between the edges 61 and 62, 62 and 63, 63 and 64, and 64 and 61, respectively; the rhomb also has two end faces. Similarly the rhomb 60 has four lateral edges 65, 66, 67, and 68, and has four lateral faces 65–66, 66–67, 67–68 and 68–65; the rhomb also has two end faces. The principal sections of the rhombs are inclined at 45° to the principal sections of the prisms 2 and 3.

The faces 64–61 and 68–65, of the rhombs 59 and 60 respectively, are cemented to the faces 5 and 7 of the prisms 2 and 3 respectively. The plane faces of the mirrors 11 and 12 are cemented to the faces 62–63 and 66–67 of the rhombs 59 and 60 respectively.

For the sake of clarity, the plane of incidence of the light beam 13 on the input face 4 is parallel to the principal sections of the prisms 2 and 3. The beam 13 is split into the beams 14 and 15. The beam 14 enters the rhomb 59 through the lateral face 64–61 in a state of linear polarization, with the direction of its electric vector at 45° to the principal sections of the rhomb, and is totally internally reflected at the face 61–62 towards the face 63–64. The beam 14 is sufficiently nearly perpendicular to the face 64–61 for its angle of reflection at the face 61–62 to lie within the tolerances of the Fresnel rhomb so that the total internal reflection of the beam at the face 61–62 introduces a phase difference of 45° between the components of the electric vector parallel to and perpendicular to the plane of incidence on the face 61–62, i.e. the reflected beam is elliptically polarized. The elliptically-polarized beam is totally internally reflected at the face 63–64 out of the rhomb through the face 62–63. This second total internal reflection introduces a phase difference of 45° between the components of the electric vector parallel to and perpendicular to the plane of incidence on the face 63–64 so that the beam which leaves the rhomb through the face 62–63 is circularly polarized. On reflection by the mirror 11 the circularly-polarized beam re-enters the rhomb through the face 62–63 and is totally internally reflected at the face 63–64 towards the face 61–62. Again, a phase difference of 45° is introduced between the components of the electric vector so that the reflected beam is elliptically polarized once more. The elliptically polarized beam is totally internally reflected at the face 61–62, out of the rhomb through the face 64– 61, introducing a further 45° phase difference so that the emergent beam is linearly polarized once more. However, the direction of the electric vector of the emergent beam is at 90° to the direction of the electric vector of the in-going beam, so the effect of the double transmission through the rhomb is to rotate the direction of linear polarization of the beam 14 through 90°, just as is done by double transmission through the quarter-wave plate 9 of the FIG. 1 device.

The effect of the rhomb 60 on the beam 15 is analagous; total internal reflection of the linearly-polarized in-going beam at the face 65–66 elliptically polarizes the beam, and total internal reflection of the elliptically-polarized beam at the face 67–68 circularly polarizes it. When the beam is reflected back into the rhomb through the face 66–67 by the mirror 12 it is totally internally reflected once more at the face 67–68 and so is elliptically polarized again. There is a final total internal reflection at the face 65–66 before the beam leaves the rhomb through the face 68–65, and this linearly polarizes the emergent beam, at 90° to the direction of linear polarization of the in-going beam. Thus, double transmission through the rhomb 60 rotates the direction of linear polarization of the beam 15 through 90°, just as is done by double transmission through the quarter-wave plate 10 of the FIG. 1 device.

The operation of a Fresnel rhomb depends on the angles at which the total internal reflections take place. Ideally, the beam being passed through a Fresnel rhomb is collimated and, in the case of the rhomb being made of glass of refractive index 1.5, both reflections take plate at an angle of 53°15′ or 50°14′. However, there is some degree of tolerance in the operation of a Fresnel rhomb, and it is for this reason that it is acceptable that the beams 14 and 15 are not collimated and accordingly the angles of incidence of the beams are not uniform over the entire cross-section of the beams.

A polarization-changing member which is more achromatic than a birefringent quarter-wave retardation plate, but less so than a Fresnel rhomb, employs a single total reflection at a surface coated, in a manner known to the art, with a stack of films of dielectric material.

A device somewhat similar to that of FIGS. 3a, 3b and 3c but modified insofar as it employs a single total internal reflection at a surface coated with a stack of dielectric films circularly to polarize a linearly-polarized light beam passed therethrough it illustrated in FIGS. 4a, 4b and 4c and it comprises two Porro prisms 69 and 70 in place of the Fresnel rhombs 59 and 60 respectively of the device of FIGS. 3a, 3b and 3c. The prism 69 has a hypotenuse face 71 and two mutually perpendicular lateral faces 72 and 73.

Similarly, the prism 70 has a hypotenuse face 74 and two mutually perpendicular lateral faces 75 and 76. The principal sections of the prisms 69 and 70 are at 45° to the principal sections of the prisms 2 and 3. The faces 73 and 76, of the prisms 69 and 70 respectively, are cemented to the faces 5 and 7 of the prisms 2 and 3 respectively. The plane faces of the mirrors 11 and 12 are cemented to the faces 72 and 75 of the prisms 69 and 70 respectively. The hypotenuse faces 71 and 74, of the prisms 69 and 70 respectively, are coated, in a manner known to the art, with stacks of films of dielectric material.

The stacks of films on the faces 71 and 74 are illustrated, on a greatly enlarged scale, at 77 and 78 in FIGS. 4c and 4b respectively.

For the sake of clarity, the plane of incidence of the incident light beam 13 on the input face 4 is parallel to the principal sections of the prisms 2 and 3. The beam 13 is split into the beams 14 and 15. The beam 14 enters the prism 69 through the lateral face 73 in a state of linear polarization, with the direction of its electric vector at 45 degrees to the principal sections of the prism 69, and is totally internally reflected at the hypotenuse face 71 towards the face 72. The total internal reflection at the coated hypotenuse face 71 introduces a phase difference of substantially 90° between the components of the electric vector parallel to and perpendicular to the plane of incidence on the coated face, and so the beam which leaves the prism 69 through the face 72 is circularly polarized. The circularly polarized beam is reflected back towards the coated hypotenuse face 71 through the face 72 by the mirror 11 and undergoes a second total internal reflection at the coated hypotenuse face 71 and leaves the prism through the face 73. This second total internal reflection introduces a further 90° phase difference between the components of the electric vector parallel to and perpendicular to the plane of incidence on the coated face 71, so the emergent beam is linearly polarized once more. However, the direction of the electric vector of the emergent beam is at 90° to the direction of the electric vector of the in-going beam, so the effect of the double transmission through the prism 69 is to rotate the direction of linear polarization of the beam 14 through 90°, just as is done by double transmission through the quarter-wave plate 9 of the FIG. 1 device. The effect of the prism 70 on the beam 15 is analagous; total internal reflection of the linearly-polarized in-going beam at the coated face 74 circularly polarizes the beam. When the beam is reflected back into the prism through the face 75 by the mirror 12 it is totally internally reflected once more at the coated face 74 before the beam leaves the prism through the face 76, and this linearly polarizes the emergent beam at 90° to the direction of linear polarization of the in-going beam. Thus, double transmission through the prism 70 rotates the direction of linear polarization of the beam 15 through 90° just as is done by double transmission through the quarter-wave plate 10 of the FIG. 1 device.

Thus, the optical effect of a double transmission of the beams 14 and 15 through the prisms 69 and 70 respectively is equivalent to that of a double transmission through a birefringent quarter-wave plate, but the technical difficulties associated with making a quarter-wave plate are avoided. The prisms 69 and 70 are less achromatic than Fresnel rhombs, for the reason stated above, namely that known polarizing combinations of dielectric films do not uniformly polarize for all wavelengths of the visible spectrum.

In relation to FIGS. 3a, 3b and 3c it was mentioned that the operation of a Fresnel rhomb depends on the angles at which total internal reflections take place. Operation of the prisms 69 and 70 depends upon the angles at which total internal reflections take place within the prisms, but when the prisms 69 and 70 are used the tolerances are wider than in the case of Fresnel rhombs because of the smaller number of total internal reflection.

A negative power lens makes negative contributions the Petzval sum and accordingly tends to impose negative field curvature on a light beam transmitted thereby. Accordingly, the effect of the device shown in FIG. 1 could be enhanced by combining it with one or more negative power lenses. Such an arrangement is shown in FIG. 3. In FIG. 3 the combination is used in a microscope, downstream of the microscope objective, to compensate for strong positive field curvature due to the microscope objective.

FIG. 3 illustrates a microscope comprising a conventionally corrected objective lens 30 and an eye-piece 39 having an optical relay system therebetween and shows the paths through the microscope of two representative rays in an image-bearing beam from a plane illuminated object 0—0′. The beam is converged by the objective 30 towards a primary image location. The beam is reflected into a horizontal path by a front surface mirror 31 and is subsequently brought to a reduced focus at P—P′ by a corrected lens 32. A positively curved primary image of the object is formed at P—P′. A front surface mirror 33 then reflects the beam upwards through a lens 34 which brings the specimen field into a state of substantial collimation. A pentagonal prism 35 reflects the collimated beam along a horizontal path so that it enters a reflecting-refracting field flattening system 36. The system 36 comprises a device 1 according to FIG. 1 and two negative power lens combinations 37 and 38. The lens combination 37 is mounted upstream of the input face 4 of the device 1 for receiving the beam from the pentagonal prism 35. The output beam from the device 1 is directed upwards and passes through the lens combination 38, which is downstream of the output face 6 of the device 1. The lens combination 37 diverges the beam to a virtual position upstream of the common center of curvature of the concave mirrors. The beams leaving the mirrors are convergent and the convergency of the recombined beam is slightly reduced by passage through the second negative lens combination 38. The recombined beams form a real image of the object in the focal plane Q—Q′ of the eyepiece 39.

The lens combinations 37 and 38 are substantially identical but this is not an essential feature of the illustrated system 36. The purpose of these lens combinations is to provide negative contributions to the Petzval sum in addition to those provided by the mirrors 11 and 12.

It may be advantageous for the lens combinations 37 and 38 to be of more complex form than shown in order to enhance the correction of residual aberrations accruing from the objective lens and the rest of the relay system. The lens combinations 37 and 38 may be designed in accordance with well-known principles to contribute optical aberrations of opposite sign to those aberrations which are notoriously difficult to remove from the conventionally corrected microscope objective 30, thereby achieving compensation and enhanced optical performance. The negative power of the lens combinations 37 and 38 results in negative secondary spectrum contributions which reduce the positive secondary spectrum associated with the objective 30, which is conventionally achromatized.

The filed flattening system 36 of FIG. 3 has positive optical power. However, a field flattening system could be precisely self-compensated so that it has zero power, yet contributes strong negative field curvature.

Since microscope objectives of different power and/or type usually differ with respect to their field curvatures and chromatic aberrations, a plurality of reflecting-refracting field flatteners, which could be conveniently interchanged by mounting them upon a movable slide or turret, may be provided. Each individual flattener would be designed substantially to compensate for the field curvature of the particular objective lens which it is to be used with.

It is thought likely that the present invention may also find use in the field of stereoscopic microscopes as follows. Hitherto, conventional stereoscopic microscopes have been either of the Greenough type or the single objective lens type. The Greenough instrument is essentially two compound microscopes, and accordingly comprises two objective lenses and two eyepieces. The respective optical axes of the two microscopes are mutually inclined and intersect at the object plane. The Greenough system permits a high degree of optical correction because both viewing axes pass centrally through the respective objective lenses. However, the inherent angular tilt of the two microscopes with respect to the specimen plane involves an ineradicable slope of the two fields of view, so that not all portions of the field of view of a flat specimen can be simultaneously in focus. This difficulty has stimulated the development of a stereoscopic microscope employing a single objective lens. In this instrument a single objective lens having an aperture large enough to be divided into two viewing pupils is arranged with its axis of symmetry normal to the specimen surface. The specimen is viewed through the two pupils with respective viewing systems. The axis of symmetry of the lens does not coincide with the optical axes of the two viewing systems. The two diametrically opposed regions of the single objective form respective primary images of the specimen surface in uniform focus, apart from field curvature due to the Petzval sum of the lens system. Although this has become a popular form of instrument its aberrations are less well corrected than is possible with instruments of the Greenough type, because the effective optical axes do not pass through the center of the objective lens, the utilized outer regions of the aperture being as a rule less well corrected than the central region.

FIG. 4 illustrates a proposed form of stereoscopic microscope employing a single reflecting objective system 400 comprising a plano-concave lens 41 and a device 1 according to FIG. 1. The illustrated microscope is arranged for viewing an object supported at a point 0 on the common optical axis of the lens 41 and the mirrors 11 and 12. The microscope includes two matched eyepieces 42 whereby a user of the microscope receives in his two eyes slightly different respective views of the object at the point 0 so as to produce a stereoscopic effect. The beam of light from the point 0 entering the objective system 400 from below may be regarded as being made up of a first pencil of light embodying one view of the object and employing one side of the objective system, and a second pencil of light embodying the other, slightly different, view of the object and employing the other side of the objective system. FIG. 4 shows the paths of two representative rays of one of these pencils. The beam is divergent where it enters the objective system 400 and accordingly the axes of the two pencils are inclined with respect to one another where they enter the objective system. The plane surface of the lens 41 is cemented to the input face 4 of the device 1 and the center of curvature of the concave surface of the lens 41 is at the point 0 and so the pencils enter the objective system 400 normally; accordingly, they reach the two concave mirrors without suffering significant aberration. The centers of curvature of the two concave mirrors are twice as remote as the point 0 and so the point 0 is substantially at the common effective focal point of the two concave mirrors; accordingly the beams 14 and 15 are substantially collimated upon reflection by the concave mirrors 11 and 12 respectively. Accordingly the output beam 16 is substantially collimated; this also leads to the respective optical axes of the two pencils of light being rendered parallel. The pencils emerge from the objective system 400 in a substantially collimated condition but with small residual monochromatic aberrations imparted by the concave mirrors. These aberrations are well-known in the art and consist mainly of primary spherical aberrations and coma. For the relatively small numerical apertures associated with stereoscopic microscopes these aberrations are small enough to be corrected by transmitting the pencils through respective matched virtually afocal lens systems 43. On leaving the lens systems 43 the two pencils are reflected upwards by a prismatic reflector 44 and are subsequently reflected along a horizontal path by a front surface mirror 45. From the mirror 45 the pencils pass through respective matched afocal magnification-changing lens systems 401 each comprising a matched pair of lenses 46 and a matched pair of lenses 47. The pencils are converged towards a common focal plane by means of respective matched telescope lenses 48. The convergent beams are thereafter deflected by means of a half-pentagonal prism 50 so as to incline the pencils at a convienent angle for receiving in the respective eyepieces 42 after having passed first through respective image-erecting boxes 51. The magnification of the microscope may be changed by replacing the matched pairs 401 by different matched pairs and/or rotating the pairs through 180° about a vertical axis so that the pencils pass through the pairs in the opposite respective directions. Alternatively, the matched pairs 401 may be replaced by a zoom lens system with continuously variable magnification. Such a zoom lens system would again comprise matched pairs of lenses.

Devices according to FIG. 1 are used in the instruments shown in FIGS. 5 and 6, but devices according to FIG. 2, FIGS. 3a, 3b and 3c, or FIGS. 4a, 4b and 4c, could be used in place of the devices 1 of FIGS. 5 and 6.

I claim:

1. An optical field flattening device for imposing a preselected degree of curvature upon an optical field associated with an image-bearing incident light beam, the device comprising: a light-polarizing beam splitter, for splitting the incident light beam into a transmitted first beam and a reflected second beam, which first and second beams are linearly polarized in mutually perpendicular respective directions; first and second concave mirrors mounted in respective dispositions, predetermined with respect to the beam splitter, for reflecting the first and second beams respectively back to the beam splitter; and respective polarization-changing members positioned between the beam splitter and the respective concave mirrors for rotating the respective directions of linear polarization of the first and second beams through 90° in the course of their passage from and back to the beam splitter; whereby the first beam after being initially transmitted by the beam splitter is subsequently reflected thereby, and the second beam after being initially reflected by the beam splitter is subsequently transmitted thereby for recombination with the first beam to form a single output beam.

2. A device as claimed in claim 1, wherein the beam splitter comprises a birefringent polarizing prism for splitting the incident light beam into an ordinary beam, which constitutes the said first beam, and an extraordinary beam, which constitutes the said second beam, and for recombining the first and second beams to form the said single output beam.

3. A device as claimed in claim 1, wherein the beam splitter comprises a prism having on a lateral face thereof a layer of dielectric material whereby light reflected at that face (to form the said second beam) is linearly polarized with its electric vector perpendicular to the plane of incidence of the light on the face and light transmitted through the layer (to form the said first beam) is linearly polarized with its electric vector parallel to the said plane of incidence.

4. A device as claimed in claim 1, wherein the two polarization-changing members comprise respective birefringent quarter-wave retardation plates of which one is mounted, between the beam splitter and the first concave mirror, with its polarization extinction direction at 45° to the direction of the electric vector of the first beam on leaving the beam splitter and of which the other is mounted, between the beam splitter and the second concave mirror, with its polarization extinction direction at 45° to the direction of the electric vector of the second beam on leaving the beam splitter.

5. A device as claimed in claim 1, wherein the two polarization-changing members comprise respective Fresnel rhombs of which one is mounted between the beam splitter and the first concave mirror with its principal sections at 45° to the direction of the electric vector of the first beam on leaving the beam splitter and of which the other is mounted between the beam splitter and the second concave mirror with its principal sections at 45° to the direction of the electric vector of the second beam on leaving the beam splitter.

6. A device as claimed in claim 1, wherein one of the two polarization-changing members comprises means mounted for presenting a totally internally reflecting surface to the first beam, which surface is coated with dielectric material, the plane of incidence of the first beam on the surface being at 45° to the direction of the electric vector of the first beam on leaving the beam splitter, and the other of the two polarization-changing members comprises means mounted for presenting a totally internally reflecting surface to the second beam, which surface is coated with dielectric material, the plane of incidence of the second beam on the surface being at 45° to the direction of the electric vector of the second beam on leaving the beam splitter.

7. A device as claimed in claim 1, wherein the first and second concave mirrors are substantially identical and are disposed on opposite respective sides of a beam-splitting layer in the beam splitter, the respective dispositions of the first and second mirrors being symmetrical with respect to one another about the beam splitting layer.

8. An optical instrument, comprising a device as claimed in claim 1, a positive-power objective lens mounted for delivering the said incident light beam to the said device from an object under examination, and an eyepiece mounted downstream of the said device for receiving the said output beam and forming an image of the said object.

9. An instrument as claimed in claim 8, wherein the said device further comprises negative-power lens means.

10. An instrument as claimed in claim 9, wherein the positive-power objective lens is achromatized for two wavelengths of light but imparts secondary chromatic aberration at a third wavelength to the incident light beam delivered thereby to the said device, the negative-power lens means being such as to compensate for the secondary chromatic aberration at the said third wavelength.

11. An instrument as claimed in claim 8, wherein the beam splitter of the said device comprises a prism having on a lateral face thereof a layer of dielectric material whereby light reflected at that face (to form the said second beam) is linearly polarized with its electric vector perpendicular to the plane of incidence of the light on the face and light transmitted through the layer (to form the said first beam) is linearly polarized with its electric vector parallel to the said plane of incidence.

12. An instrument as claimed in claim 11, wherein the two polarization-changing members of the said device comprise respective birefringent quarter-wave retardation plates of which one is mounted, between the beam splitter and the first concave mirror, with its polarization extinction direction at 45° to the direction of the electric vector of the first beam on leaving the beam splitter and of which the other is mounted, between the beam splitter and the second concave mirror, with its polarization extinction direction at 45° to the direction of the electric vector of the second beam on leaving the beam splitter.

13. A microscope, comprising a reflecting objective comprising a device as claimed in claim 1, the microscope further comprising a first eyepiece mounted downstream of the reflecting objective for viewing an object under examination through one portion of the said reflecting objective, and a second eyepiece mounted downstream of the reflecting objective for viewing the object through a different portion of the said reflecting objective, whereby the combined view obtained through the first and second eyepieces is a stereoscopic view of the object.

14. A microscope as claimed in claim 13, wherein the beam splitter of the said device comprises a prism having on a lateral face thereof a layer of dielectric material whereby light reflected at that face (to form the said second beam) is linearly polarized with its electric vector perpendicular to the plane of incidence of the light on the face and light transmitted through the layer (to form the said first beam) is linearly polarized with its electric vector parallel to the said plane of incidence.

15. A microscope as claimed in claim 14, wherein the two polarization-changing members of the said device comprise respective birefringent quarter-wave retardation plates of which one is mounted, between the beam splitter and the first concave mirror, with its polarization extinction direction at 45° to the direction of the electric vector of the first beam on leaving the beam splitter and of which the other is mounted, between the beam splitter and the second concave mirror, with its polarization extinction direction at 45° to the direction of the electric vector of the second beam on leaving the beam splitter.

* * * * *